(12) United States Patent
Barochia et al.

(10) Patent No.: US 11,292,969 B2
(45) Date of Patent: Apr. 5, 2022

(54) CATALYST AND METHOD RELATED THERETO FOR SYNTHESIS OF HYDROCARBONS FROM SYNGAS

(71) Applicant: SABIC Global Technologies B.V., Bergen op Zoom (NL)

(72) Inventors: Jayen Barochia, Riyadh (SA); Khalid Karim, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/975,327

(22) PCT Filed: Mar. 1, 2019

(86) PCT No.: PCT/IB2019/051673
§ 371 (c)(1),
(2) Date: Aug. 24, 2020

(87) PCT Pub. No.: WO2019/171228
PCT Pub. Date: Sep. 12, 2019

(65) Prior Publication Data
US 2021/0363430 A1 Nov. 25, 2021

Related U.S. Application Data

(60) Provisional application No. 62/639,624, filed on Mar. 7, 2018.

(51) Int. Cl.
| | | |
|---|---|---|
| *C10G 2/00* | (2006.01) | |
| *B01J 21/02* | (2006.01) | |
| *B01J 23/75* | (2006.01) | |
| *B01J 23/889* | (2006.01) | |
| *B01J 23/00* | (2006.01) | |
| *B01J 21/04* | (2006.01) | |
| *B01J 37/08* | (2006.01) | |
| *B01J 35/10* | (2006.01) | |
| *B01J 35/02* | (2006.01) | |
| *B01J 37/04* | (2006.01) | |

(52) U.S. Cl.
CPC .............. *C10G 2/332* (2013.01); *B01J 21/04* (2013.01); *B01J 23/002* (2013.01); *B01J 23/75* (2013.01); *B01J 23/8892* (2013.01); *B01J 35/023* (2013.01); *B01J 35/1014* (2013.01); *B01J 35/1019* (2013.01); *B01J 37/04* (2013.01); *B01J 37/082* (2013.01)

(58) Field of Classification Search
CPC .................................................... B01J 23/8892
See application file for complete search history.

(56) References Cited

U.S. PATENT DOCUMENTS

| 5,162,284 A | 11/1992 | Soled et al. |
| 2010/0174002 A1 | 7/2010 | Kibby et al. |
| 2016/0175819 A1 | 6/2016 | Karim et al. |
| 2016/0296914 A1 | 10/2016 | Calderone et al. |

FOREIGN PATENT DOCUMENTS

| CN | 103752322 A | 4/2014 |
| WO | WO2016091696 A1 | 6/2016 |

OTHER PUBLICATIONS

Das et al. "Synthesis of light alkenes from syngas on silicalite-1 supported cobalt and cobalt-manganese catalysts." Applied Catalysis A: General 131 (1995) 335-345.
International Search Report and Written Opinion from PCT/IB2019/051673 dated Jun. 21, 2019, 11 pages.
Riet et al. "Selective formation of $C_3$ hydrocarbons from $CO+H_2$ using cobalt-manganese oxide catalysts." J. Chem. Soc., Chem. Commun., 1986, pp. 798-799.

*Primary Examiner* — Medhanit W Bahta
(74) *Attorney, Agent, or Firm* — Norton Rose Fulbright US LLP

(57) ABSTRACT

The present disclosures and inventions relate to a catalyst composition for the selective conversion of a hydrogen/carbon monoxide mixture (syngas) to C2+ hydrocarbons. The composition includes a catalyst having the formula $CoMn_xSi_yO_z$, wherein the molar ratio of x is from about 0.8 to about 1.2; wherein the molar ratio of y is from about 0.1 to about 1.0; and wherein the molar ratio of z is a number determined by the valence requirements of Co, Mn, and Si wherein the catalyst has a Scherrer crystallite size of less than about 40 nm, wherein the Si is silica.

20 Claims, 1 Drawing Sheet

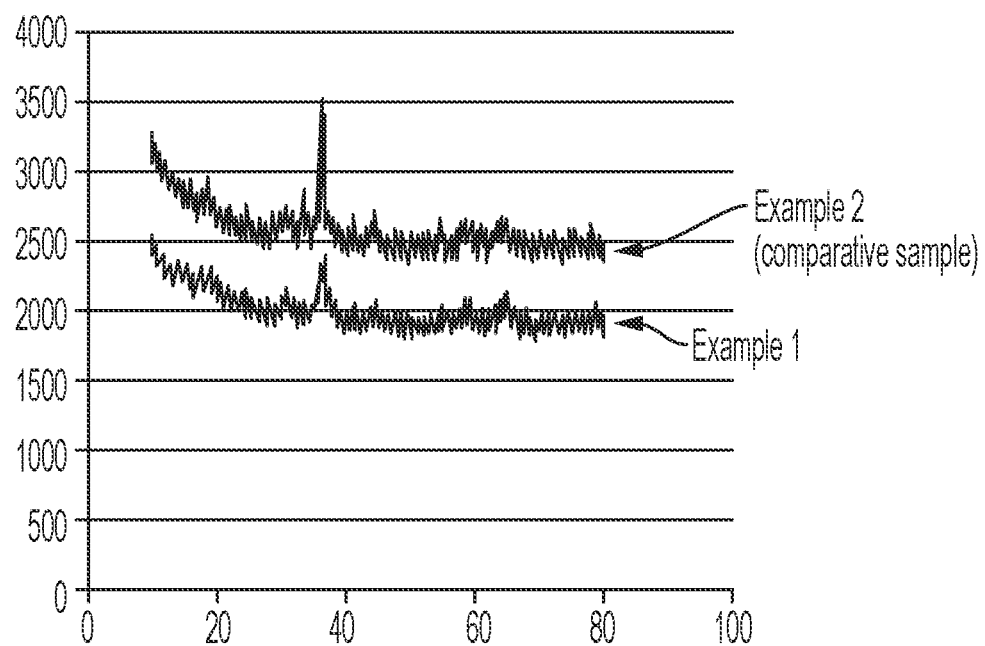

CATALYST AND METHOD RELATED THERETO FOR SYNTHESIS OF HYDROCARBONS FROM SYNGAS

CROSS-REFERENCE TO RELATED APPLICATIONS

This application is a national phase application under 35 U.S.C. § 371 of International Application No. PCT/IB2019/051673 filed Mar. 1, 2019, which claims priority to U.S. Provisional Patent Application No. 62/639,624 filed Mar. 7, 2018. The entire contents of each of the above-referenced disclosures is specifically incorporated by reference herein without disclaimer.

FIELD OF THE INVENTIONS

The compositions and methods disclosed herein relate to catalyst compositions for the conversion of hydrogen/carbon monoxide mixtures (syngas) to hydrocarbons.

BACKGROUND

Syngas (mixtures of $H_2$ and CO) can be readily produced from either coal or methane (natural gas) by methods well known in the art and widely commercially practiced around the world. A number of well-known industrial processes use syngas for producing various hydrocarbons and oxygenated organic chemicals.

The Fischer-Tropsch catalytic process for catalytically producing hydrocarbons from syngas was initially discovered and developed in the 1920's, and was used in South Africa for many years to produce gasoline range hydrocarbons as automotive fuels. The catalysts typically comprised iron or cobalt supported on alumina or titania, and promoters, like rhenium, zirconium, manganese, and the like, were sometimes used with cobalt catalysts to improve various aspects of catalytic performance. The products were typically gasoline-range hydrocarbon liquids having six or more carbon atoms, along with heavier hydrocarbon products.

Today lower molecular weight hydrocarbons are desired and can be obtained from syngas via the Fischer-Tropsch catalytic process. Challenges exist to efficiently produce C2+ hydrocarbons at high yields without producing an excess of unwanted side products.

Accordingly, there remains a long-term market need for new and improved catalysts and methods related thereto for producing increased amounts of hydrocarbons, such as C2+ hydrocarbons, from syngas. Catalysts and methods useful for the production of hydrocarbons, such as C2+ hydrocarbons, from syngas are described herein.

SUMMARY OF THE INVENTION

Disclosed herein is a composition comprising a catalyst having the formula $CoMn_xSi_yO_z$, wherein the molar ratio of x is from about 0.8 to about 1.2; wherein the molar ratio of y is from about 0.1 to about 1.0; and wherein the molar ratio of z is a number determined by the valence requirements of Co, Mn, and Si wherein the catalyst has a Scherrer crystallite size of less than about 40 nm, wherein the Si is silica.

Also disclosed herein is a method of preparing a $CoMn_xSi_yO_z$ catalyst disclosed herein comprising the steps of: a) mixing a solution comprising an aqueous or polar solvent, silica, a cobalt salt, and a manganese salt with ammonium carbonate, thereby forming the $CoMn_xSi_yO_z$ catalyst.

Also disclosed herein is a method of producing C2+ hydrocarbons comprising contacting syngas with a composition comprising a catalyst having the formula $CoMn_xSi_yO_z$, as disclosed herein, thereby producing C2+ hydrocarbons.

Additional advantages will be set forth in part in the description which follows, and in part will be obvious from the description, or can be learned by practice of the aspects described below. The advantages described below will be realized and attained by means of the chemical compositions, methods, and combinations thereof particularly pointed out in the appended claims. It is to be understood that both the foregoing general description and the following detailed description are exemplary and explanatory only and are not restrictive.

DETAILED DESCRIPTION OF THE FIGURES

These and other features of the preferred embodiments of the invention will become more apparent in the detailed description in which reference is made to the appended drawing.

the FIGURE shows x-ray powder diffraction (XRD) patterns of the catalysts of Example 1 and Example 2 (comparative).

DETAILED DESCRIPTION

Disclosed herein are materials, compounds, catalysts, compositions, and components that can be used for, can be used in conjunction with, can be used in preparation for, or are products of the disclosed method and compositions. It is to be understood that when combinations, subsets, interactions, groups, etc. of these materials are disclosed that while specific reference of each various individual and collective combinations and permutation of these compounds cannot be explicitly disclosed, each is specifically contemplated and described herein. For example, if a catalyst component is disclosed and discussed, and a number of alternative solid state forms of that component are discussed, each and every combination and permutation of the catalyst component and the solid state forms that are possible are specifically contemplated unless specifically indicated to the contrary. This concept applies to all aspects of this disclosure including, but not limited to, steps in methods of making and using the disclosed compositions. Thus, if there are a variety of additional steps that can be performed, it is understood that each of these additional steps can be performed with any specific aspect or combination of aspects of the disclosed methods, and that each such combination is specifically contemplated and should be considered disclosed.

In this specification and in the claims which follow, reference will be made to a number of terms which shall be defined to have the following meanings:

It must be noted that, as used in the specification and the appended claims, the singular forms "a," "an" and "the" include plural referents unless the context clearly dictates otherwise. Thus, for example, reference to "a support material" includes mixtures of support materials.

"Optional" or "optionally" means that the subsequently described event or circumstance can or cannot occur, and that the description includes instances where the event or circumstance occurs and instances where it does not.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The word "or" as used herein means any one member of a particular list and also includes any combination of members of that list.

Ranges can be expressed herein as from one particular value, and/or to another particular value. When such a range is expressed, another aspect includes from the one particular value and/or to the other particular value. Similarly, when values are expressed as approximations, by use of the antecedent "," it will be understood that the particular value forms another aspect. It will be further understood that the endpoints of each of the ranges are significant both in relation to the other endpoint, and independently of the other endpoint.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight of component Y, X and Y are present at a weight ratio of 2:5, and are present in such a ratio regardless of whether additional components are contained in the compound.

A weight percent of a component, unless specifically stated to the contrary, is based on the total weight of the formulation or composition in which the component is included.

1. Catalyst for Converting Syngas to Hydrocarbons

Described herein is a composition comprising a catalyst for converting syngas to hydrocarbons, for example, selectively converting syngas to C2+ hydrocarbons, such as, for example, $C_2$-$C_6$ hydrocarbons or $C_2$-$C_4$ hydrocarbons. The composition disclosed herein has an improved conversion rate and selectivity for converting syngas to C2+ hydrocarbons, such as, for example, $C_2$-$C_6$ hydrocarbons or $C_2$-$C_4$ hydrocarbons, as compared to conventional catalysts.

Disclosed herein is a composition comprising a catalyst having the formula $CoMn_xSi_yO_z$, wherein the molar ratio of x is from about 0.8 to about 1.2; wherein the molar ratio of y is from about 0.1 to about 1.0; and wherein the molar ratio of z is a number determined by the valence requirements of Co, Mn, and Si wherein the catalyst has a Scherrer crystallite size of less than about 40 nm, wherein the Si is silica.

The composition comprising a catalyst having the formula $CoMn_xSi_yO_z$ disclosed herein have a low water gas shift activity as compared to conventional catalyst. The water gas shift reaction provides a source of $H_2$ and $CO_2$ at the expense of CO and $H_2O$. Thus, unwanted $CO_2$ is produced by the water gas shift reaction. The composition comprising a catalyst having the formula $CoMn_xSi_yO_z$ disclosed herein have a low water gas shift activity, thereby producing a low amount of $CO_2$ as shown herein. For example, the composition comprising a catalyst having the formula $CoMn_xSi_yO_z$ disclosed herein have a water gas shift reaction that produces less than 10%, less than 5%, or less than 3% $CO_2$ from the carbon monoxide feed. Accordingly, the composition comprising a catalyst having the formula $CoMn_xSi_yO_z$ disclosed herein can have a $CO_2$ selectivity that is less than 10%, less than 5%, or less than 3%.

In one aspect, the composition consists essentially of a catalyst having the formula $CoMn_xSi_yO_z$, wherein the molar ratio of x is from about 0.8 to about 1.2; wherein the molar ratio of y is from about 0.1 to about 1.0; and wherein the molar ratio of z is a number determined by the valence requirements of Co, Mn, and Si wherein the catalyst has a Scherrer crystallite size of less than about 40 nm, wherein the Si is silica. In another aspect, composition consists of a catalyst having the formula $CoMn_xSi_yO_z$, wherein the molar ratio of x is from about 0.8 to about 1.2; wherein the molar ratio of y is from about 0.1 to about 1.0; and wherein the molar ratio of z is a number determined by the valence requirements of Co, Mn, and Si wherein the catalyst has a Scherrer crystallite size of less than about 40 nm, wherein the Si is silica.

The $CoMn_xSi_yO_z$ catalyst herein can be non-stoichiometric solids, i.e. single phase solid materials whose composition cannot be represented by simple ratios of well-defined simple integers, because those solids probably contain solid state point defects (such as vacancies or interstitial atoms or ions) that can cause variations in the overall stoichiometry of the composition. Such phenomena are well known to those of ordinary skill in the arts related to solid inorganic materials, especially for transition metal oxides. Accordingly, for convenience and the purposes of this disclosure, the composition of the potentially non-stoichiometric catalytically active solids described herein will be quoted in ratios of moles of the other atoms as compared to the moles of cobalt and manganese ions or atoms in the same composition, whatever the absolute concentration of cobalt and manganese present in the composition. Accordingly, for purposes of this disclosure, the value of "x" and "y" are molar ratios relative to each other, regardless of the absolute concentration of cobalt and manganese in the catalyst. Thus, the subscript numbers represents molar ratios.

In the composition comprising the $CoMn_xSi_yO_z$ catalyst, the molar ratio of manganese atoms to cobalt atoms, i.e. the value of "x" in the catalyst formula, can be from about 0.8 to about 1.2, from about 0.8 to about 1.1, from about 0.8 to about 1.0, from about 0.8 to about 0.9, from about 0.9 to about 1.2, from about 0.9 to about 1.1, from about 0.9 to about 1.0, from about 1.0 to about 1.2, or from about 1.0 to about 1.1. In one aspect, x can be about 1.0.

In the composition comprising the $CoMn_xSi_yO_z$ catalyst, the molar ratio of Si atoms to cobalt atoms, i.e. the value of "y" in the catalyst formula, can be from about 0.1 to about 1.0, from about 0.3 to about 1.0, from about 0.5 to about 1.0, from about 0.7 to about 1.0, from about 0.1 to about 0.8, from about 0.3 to about 0.8, or from about 0.1 to about 0.5. In one aspect, y can be about 1.0 or about 0.5.

In one aspect, the molar ratio of x can be about 1.0 and the molar ratio of y can be from about 0.1 to about 1.0. In another aspect, the molar ratio of x can be from about 0.9 to about 1.1 and the molar ratio of y can be from about 0.1 to about 1.0. In yet another aspect, the molar ratio of x can be from about 0.9 to about 1.1 and the molar ratio of y can be from about 0.1 to about 0.8. In yet another aspect, the molar ratio of x can be from about 0.9 to about 1.1 and the molar ratio of y can be from about 0.5 to about 1.0.

In the composition comprising the $CoMn_xSi_yO_z$ catalyst, the molar ratio of oxygen atoms, i.e. the value of "z" in the catalyst formula, is a number determined by the valence requirements of Co, Mn, and Si. In one aspect, z is greater than 0 (zero). In another aspect, z can be 0 (zero). Even though a suitable catalyst composition of these inventions may be prepared or loaded into a reactor in the form of a mixed oxide (i.e. z is initially greater than 0), contact with hot syngas, either before or during the catalytic conversion of syngas to hydrocarbons begins, may result in the "in-situ" reduction of the catalyst composition and/or partial or complete removal of oxygen from the solid catalyst composition, with the result that z can be decreased to zero or zero. In one aspect, the value of z can be any whole integer or decimal fraction between 0 and 10. In some aspects of the catalyst described herein, z is greater than zero. In some aspects of the catalysts described herein, z can be from 1 to 5.

In the composition comprising the $CoMn_xSi_yO_z$ catalyst, the catalyst has a Scherrer crystallite size of less than about 40 nm. The Scherrer crystallite size of the catalyst is determined by the Scherrer equation. The Scherrer equation, in X-ray diffraction and crystallography, is a formula that relates the size of crystallites in a solid, to the broadening of a peak in a diffraction pattern. The Scherrer equation is well known in the art. The Scherrer equation (Eq. 1) is as follows:

$$\tau = \frac{K\lambda}{\beta\cos\theta} \quad \text{Eq. 1}$$

where: $\tau$ is the mean size of the ordered (crystalline) domains, which may be smaller or equal to the grain size; K is a dimensionless shape factor, with a value close to unity. The shape factor has a typical value of about 0.9, but varies with the actual shape of the crystallite; $\lambda$ is the X-ray wavelength; $\beta$ is the line broadening at half the maximum intensity (FWHM), after subtracting the instrumental line broadening, in radians; $\theta$ is the Bragg angle.

In one aspect, in the composition comprising the $CoMn_xSi_yO_z$ catalyst, the catalyst has a Scherrer crystallite size of less than about 35 nm. In another aspect, in the composition comprising the $CoMn_xSi_yO_z$ catalyst, the catalyst has a Scherrer crystallite size of less than about 30 nm. In yet another aspect, in the composition comprising the $CoMn_xSi_yO_z$ catalyst, the catalyst has a Scherrer crystallite size of less than about 25 nm. In yet another aspect, in the composition comprising the $CoMn_xSi_yO_z$ catalyst, the catalyst has a Scherrer crystallite size of less than about 20 nm. In yet another aspect, in the composition comprising the $CoMn_xSi_yO_z$ catalyst, the catalyst has a Scherrer crystallite size of less than about 15 nm. In yet another aspect, in the composition comprising the $CoMn_xSi_yO_z$ catalyst, the catalyst has a Scherrer crystallite size from about 10 nm to about 40 nm. In yet another aspect, in the composition comprising the $CoMn_xSi_yO_z$ catalyst, the catalyst has a Scherrer crystallite size from about 10 nm to about 35 nm. In yet another aspect, in the composition comprising the $CoMn_xSi_yO_z$ catalyst, the catalyst has a Scherrer crystallite size from about 10 nm to about 30 nm. In yet another aspect, in the composition comprising the $CoMn_xSi_yO_z$ catalyst, the catalyst has a Scherrer crystallite size from about 10 nm to about 25 nm. In yet another aspect, in the composition comprising the $CoMn_xSi_yO_z$ catalyst, the catalyst has a Scherrer crystallite size from about 10 nm to about 20 nm. In yet another aspect, in the composition comprising the $CoMn_xSi_yO_z$ catalyst, the catalyst has a Scherrer crystallite size from about 15 nm to about 25 nm.

In one aspect, in the composition comprising the $CoMn_xSi_yO_z$ catalyst, the catalyst has a BET surface area from about 60 m$^2$/g to about 110 m$^2$/g. In another aspect, in the composition comprising the $CoMn_xSi_yO_z$ catalyst, the catalyst has a BET surface area from about 80 m$^2$/g to about 110 m$^2$/g. In yet another aspect, in the composition comprising the $CoMn_xSi_yO_z$ catalyst, the catalyst has a BET surface area from about 90 m$^2$/g to about 110 m$^2$/g. In yet another aspect, in the composition comprising the $CoMn_xSi_yO_z$ catalyst, the catalyst has a BET surface area from about 60 m$^2$/g to about 90 m$^2$/g.

In one aspect, the composition comprising the $CoMn_xSi_yO_z$ catalyst further comprises a support material. In such an aspect, the $CoMn_xSi_yO_z$ catalyst is dispersed on or onto the catalyst support material. The support materials are typically catalytically inert, but typically provide physical support, strength and integrity to catalyst particles or pellets containing both the catalyst compositions and the support material, so that catalyst lifetimes are improved. Suitable support materials for the catalyst compositions described herein include a support material comprising $Al_2O_3$, $SiO_2$, $TiO_2$, $CeO_2$, $AlPO_4$, $ZrO_2$, MgO, $ThO_2$, boehmite, silicon-carbide, Molybdenum-carbide, an aluminosilicate, kaolin, a zeolite, or a molecular sieve, or a mixture thereof.

In one aspect, the composition essentially consists of the $CoMn_xSi_yO_z$ catalyst and a support material. In another aspect, the composition consists of the $CoMn_xSi_yO_z$ catalyst and a support material.

In one aspect, in the composition comprising the $CoMn_xSi_yO_z$ catalyst, the catalyst has a perovskite structure. The $CoMn_xSi_yO_z$ catalyst has a perovskite structure when the $CoMn_xSi_yO_z$ catalyst has the same crystal structure as calcium titanium oxide ($CaTiO_3$). The term "perovskite 'structure" is well known in the art.

2. Methods for Preparing the Catalyst

Also disclosed herein is a method of preparing a CoMnSi catalyst. In one aspect, the CoMnSi catalyst is a $CoMn_xSi_yO_z$ catalyst, or a composition comprising a $CoMn_xSi_yO_z$ catalyst disclosed herein.

Accordingly, disclosed herein is a method of preparing a $CoMn_xSi_yO_z$ catalyst disclosed herein comprising the steps of:

a) mixing a solution comprising an aqueous or polar solvent, silica, a cobalt salt, and a manganese salt with ammonium carbonate, thereby forming the $CoMn_xSi_yO_z$ catalyst.

The disclosed method uses ammonium carbonate as a precipitating agent. As shown and described herein, the $CoMn_xSi_yO_z$ catalyst resulting from a method using ammonium carbonate as a precipitating agent surprisingly has improved properties, such as, improved conversion rate and selectivity for converting syngas to $C_2$-$C_6$ hydrocarbons, such as, for example, $C_2$-$C_4$ hydrocarbons, as compared to a $CoMn_xSi_yO_z$ catalyst prepared using conventional precipitating agents, such as, for example, water soluble carbonates and bicarbonates of metals like sodium, potassium, lithium, and cesium.

The concentration of ammonium carbonate can be varied in the method. In one aspect, ammonium carbonate can be used to alter the pH of the aqueous solution. For example, the mixing step of the method can comprise adding ammonium carbonate to the solution to adjust the pH of the solution to from about 6.5 to about 8.5, such as for example, to adjust the pH of the solution to from about 7.0 to about 7.5.

The step(s) of the methods for preparing the catalyst compositions described herein relates to providing a solution comprising silica, Co (cobalt atoms or ions (salts)), and Mn (cobalt atoms or ions (salts)). Many suitable compounds comprising Co that are soluble in suitable solvents can be suitable and are known to those of ordinary skill in the art. In one aspect, water or low molecular weight alcohols, or mixtures thereof can be suitable solvents for this step. Any cobalt (II) or (III) salt that is soluble in an aqueous solution, such as water, can be used, and the use of cobalt (II) nitrate, cobalt tris(acetylacetonate), cobalt bis(acetylacetonate), cobalt (II) chloride, cobalt (II) bromide, cobalt (H) iodide, cobalt (II) acetate, cobalt (ii) sulfate, and cobalt (II) diacetate, or a combination thereof are a specific examples of a suitable Co compound that can be dissolved to provide a suitable solution comprising Co. Any manganese (II) or (III) salt that is soluble in an aqueous solution, such as water, can be used, and the use of manganese (II) nitrate or manganese (II) acetate are a specific examples of suitable Mn compounds that can be dissolved to provide a suitable solution comprising Mn.

In one aspect, the silica is hydrophilic silica.

In one aspect, the solution comprises from about 0.1 mole % to about 2.0 mole %, such as for example, from about 0.5 mole % to about 1.5 mole %, of the cobalt salt prior to the formation of the $CoMn_xSi_yO_z$ catalyst. In another aspect, the solution comprises from about 0.1 mole % to about 2.0 mole %, such as for example from about 0.5 mole % to about 1.5 mole %, of the manganese salt prior to the formation of the $CoMn_xSi_yO_z$ catalyst.

In one aspect, the solution comprising an aqueous or polar solvent, the aqueous or polar solvent is selected from the group consisting of water and glycol, or a combination thereof. In one aspect, the solution comprising an aqueous or polar solvent is water. In another aspect, the solution comprises water and glycol, wherein the glycol is selected from the group consisting of ethylene glycol, propylene glycol, dipropylene glycol, tripropylene glycol, and butylene glycol, or a combination thereof.

In one aspect, the temperature of the solution is from about 20° C. to about 40° C. during the mixing step. In another aspect, the temperature of the solution is from about 25° C. to about 35° C. during the mixing step.

In one aspect, the method further comprises drying the $CoMn_xSi_yO_z$ catalyst. In another aspect, the $CoMn_xSi_yO_z$ catalyst is not filtered or washed prior to the drying step. One advantage of using ammonium carbonate as a precipitating agent is that the $CoMn_xSi_yO_z$ catalyst can be processed without first having to filter and/or wash the $CoMn_xSi_yO_z$ catalyst. Of course, in one aspect, the $CoMn_xSi_yO_z$ catalyst can still be filtered, washed, and dried.

In one aspect of the methods for making the catalyst compositions, the method further comprises calcining the $CoMn_xSi_yO_z$ catalyst in the presence of oxygen or air at high temperatures (such as for example exposing the catalyst composition to a temperature of from, about 200° C. to about 800° C.), or similar heating under a dry inert gas such as nitrogen, can also be required in order to fully form the catalyst compositions. For example, calcining can result in the conversion of a physical mixture of components to form the catalyst phase, via various chemical reactions, such as for example the introduction of oxygen atoms or ions into the composition. In one aspect, the method further comprises calcining the dried $CoMn_xSi_yO_z$ catalyst at a temperature from about 400° C. to about 600° C.

It is also to be understood that in some aspects of the compositions and methods described herein, once a catalyst has been formed by the methods described above, and the formed catalyst is loaded into reactors and contacted with syngas at reaction temperatures for significant periods of time, some physical and chemical changes can occur in the catalyst, either quickly or over time as the catalytic reactions with syngas are carried out. For example, contact of the metal oxide catalysts described herein with syngas at high temperatures can cause partial or complete "in-situ" reduction of the metal oxides, and such reduction processes can cause removal of oxygen atoms from the solid catalyst lattices, and/or cause reduction of some or all of the metal cations present in the catalyst to lower oxidation states, including reduction to metallic oxidation states of zero, thereby producing finely divided and/or dispersed metals on the catalyst supports. Such reduced forms of the catalysts of the invention are within the scope of the described compositions and methods.

The possible components and ranges of components for such compositions have already been described above, and can be applied in connection with describing and claiming methods for preparing such compositions.

In one aspect, the catalysts formed by the method disclosed herein can also be mixed with or dispersed on a support material. In one aspect, the $CoMn_xSi_yO_z$ catalyst is sprayed onto the support material. Suitable support materials include $Al_2O_3$, $SiO_2$, $TiO_2$, $CeO_2$, $AlPO_4$, $ZrO_2$, MgO, $ThO_2$, boehmite, silicon-carbide, Molybdenum-carbide, an alumino-silicate, kaolin, a zeolite, or a molecular sieve, or a mixture thereof.

In view of the general descriptions of the preparations of the catalyst compositions and variations thereof that are part of these inventions described above, herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language and formulas literally used therein.

3. Methods for Producing Hydrocarbons from Syngas

Described above is a composition comprising a catalyst having the generic formula $CoMn_xSi_yO_z$ and methods for making such a catalyst. The catalyst is useful for converting mixtures of carbon monoxide and hydrogen (syngas) to hydrocarbons. The catalyst has unexpectedly high conversions of CO and selectivity for converting syngas to C2+ hydrocarbons, such as to low molecular weight hydrocarbons such as $C_2$-$C_6$ hydrocarbons, such as, $C_2$-$C_4$ hydrocarbons.

Also disclosed herein is a method of producing C2+ hydrocarbons comprising contacting syngas with a composition comprising a catalyst having the formula $CoMn_xSi_yO_z$, as disclosed herein, thereby producing C2+ hydrocarbons, such as $C_2$-$C_6$ hydrocarbons, such as, $C_2$-$C_4$ hydrocarbons.

The catalyst composition has a formula comprising $CoMn_xSi_yO_z$ prior to introducing it to conditions suitable for contacting and reacting the catalyst composition with the syngas. Such conditions are known in the art and include high temperatures. The catalyst composition is reduced when present in the conditions associated with process of producing C2+ hydrocarbons by contacting the catalyst composition with syngas. Such catalyst composition is and can be referred to herein as a "reduced form of a catalyst composition comprising." A reduction of the catalyst compositions under such conditions is known to those skilled in the art.

In these methods, mixtures of carbon monoxide and hydrogen (syngas) are contacted with suitable catalysts (whose composition, characteristics, and preparation have been already described above and in the Examples below) in suitable reactors and at suitable temperatures and pressures, for a contact time and/or at a suitable space velocity needed in order to convert at least some of the syngas to hydrocarbons. Unexpectedly as compared to methods in the prior art, the methods of the present inventions can be highly selective for the production of C2+ hydrocarbons, which are valuable feedstocks for subsequent cracking processes at refineries for producing downstream products, such as low molecular weight olefins. C2+ hydrocarbons can be $C_2$-$C_{12}$ hydrocarbons, $C_2$-$C_8$ hydrocarbons, $C_2$-$C_6$ hydrocarbons, $C_2$-$C_4$ hydrocarbons or $C_2$-$C_3$ hydrocarbons.

Methods for producing syngas from natural gas, coal, or waste streams or biomass, at almost any desired ratio of hydrogen to carbon monoxide are well known to those of ordinary skill in the art. A large range of ratios of hydrogen to carbon monoxide can be suitable for the practice of the current invention, but since high conversion of carbon monoxide to hydrocarbons is desired, syngas mixtures comprising at least equimolar ratios of hydrogen to carbon monoxide or higher are typically employed, i.e. from 3:1 $H_2/CO$ to 1:1 $H_2/CO$. In some aspects, the ratios of hydrogen to carbon monoxide employed are from 2:1 $H_2/CO$ to 1:1 $H_2/CO$. Optionally, inert or reactive carrier gases, such as $N_2$, $CO_2$, methane, ethane, propane, and the like can be contained in and/or mixed with the syngas.

The syngas is typically forced to flow through reactors comprising the solid catalysts, wherein the reactors are designed to retain the catalyst against the vapor phase flow of syngas, at temperatures sufficient to maintain most of the hydrocarbon products of the catalytic reactions in the vapor phase at the selected operating pressures. The catalyst particles can be packed into a fixed bed, or dispersed in a fluidized bed, or in other suitable arrangements known to those of ordinary skill in the art.

In one aspect, the syngas is contacted with the catalyst compositions at a temperature of at least 200° C., or at least 300° C., and at a temperature below 400° C. or from a temperature of 200° C. to 350° C., or from a temperature of 230° C. to 270° C.

In one aspect, the syngas is contacted with the catalyst compositions at a pressure of at least 3 bar, 5 bar, or at least, 10 bar, or at least 15 bar, or at least 25 bar, or at least 50 bar, or at least 75 bar, and less than 200 bar, or less than 100 bar. In many aspects of the methods of the reaction, the syngas is contacted with the catalyst compositions at a pressure from 5 bar to 100 bar. In many aspects of the methods of the reaction, the syngas is contacted with the catalyst compositions at a pressure from about 3 bar to about 15 bar.

In one aspect, the syngas is contacted with the catalyst compositions to produce relatively high conversions of the carbon monoxide present in syngas. In one aspect, conversion of carbon monoxide is at least 55%, at least 60%, at least 70%, or at least 80%. In some aspects of the methods, at least 50%, at least 60%, at least 70%, or at least 80% of the syngas is converted to product materials. In one aspect, less than 10%, or less than 5% of the carbon monoxide fed to the reactors is converted to $CO_2$.

In one aspect, the methods of the inventions are unexpectedly highly selective for the production of C2+ hydrocarbons. Typical C2+ hydrocarbons, detected in the product include saturated hydrocarbons such as methane, ethane, propanes, butanes, and pentanes, and unsaturated hydrocarbons such as ethylene, propylene, butenes, and pentenes. In one aspect, the method has an unexpectedly higher selectivity for $C_2$-$C_4$ and $C_2$-$C_3$ hydrocarbons as compared to a reference catalyst not being prepared with ammonium carbonate as the precipitating agent.

In one aspect, the selectivity for production of $C_2$-$C_4$ hydrocarbons can be from about 10% to about 40%, from about 15% to about 30%, from about 20% to about 25%. In one aspect, the selectivity for production of $C_2$-$C_3$ hydrocarbons can be from about 10% to about 30%, from about 10% to about 20%, from about 15% to about 20%.

The production of methane in a Fischer-Tropsch process is undesired. In one aspect, the selectivity for production of methane can be less than about 15%, less than about 12%, less than about 10%, or less than about 8%.

In view of the general descriptions of the catalyst compositions and variations thereof that are part of the inventions described above, herein below are described certain more particularly described aspects of methods for employing the catalysts for converting syngas to hydrocarbons. These particularly recited aspects should not however be interpreted to have any limiting effect on any different claims containing different or more general teachings, or that the "particular" aspects are somehow limited in some way other than the inherent meanings of the language and formulas literally used therein.

4. Aspects

In view of the described catalyst and catalyst compositions and methods and variations thereof, herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language and formulas literally used therein.

Aspect 1: A composition comprising a catalyst having the formula $CoMn_xSi_yO_z$,
  wherein the molar ratio of x is from about 0.8 to about 1.2;
  wherein the molar ratio of y is from about 0.1 to about 1.0; and
  wherein the molar ratio of z is a number determined by the valence requirements of Co, Mn, and Si wherein the catalyst has a Scherrer crystallite size of less than about 40 nm,
  wherein the Si is silica.

Aspect 2: The composition of aspect 1, wherein the molar ratio of x is about 1.0.

Aspect 3: The composition of aspects 1 or 2, wherein the molar ratio of y is from about 0.3 to about 0.8.

Aspect 4: The composition of any one of aspects 1-3, wherein the catalyst has a BET surface area from about 60 $m^2/g$ to about 110 $m^2/g$.

Aspect 5: The composition of any one of aspects 1-4, wherein the catalyst has a perovskite structure.

Aspect 6: The composition of any one of aspects 1-5, wherein the catalyst has a Scherrer crystallite size from about 10 nm to about 35 nm.

Aspect 7: The composition of any one of aspects 1-5, wherein the catalyst has a Scherrer crystallite size of less than about 25 nm.

Aspect 8: The composition of any one of aspects 1-5, wherein the catalyst has a Scherrer crystallite size from about 10 nm to about 25 nm.

Aspect 9: The composition of any one of aspects 1-8, further comprising a support material.

Aspect 10: The composition of any one of aspects 1-9, wherein the support material comprises $Al_2O_3$, $SiO_2$, $TiO_2$, $CeO_2$, $AlPO_4$, $ZrO_2$, MgO, $ThO_2$, boehmite, silicon-carbide, Molybdenum-carbide, an alumino-silicate, kaolin, a zeolite, or a molecular sieve, or a mixture thereof.

Aspect 11: The composition of any one of aspects 1-10, wherein the composition selectively converts syngas to $C_2$-$C_6$ hydrocarbons.

Aspect 12: A method of producing C2+ hydrocarbons comprising contacting syngas with the composition of any one of aspects 1-11, thereby producing C2+ hydrocarbons.

Aspect 13: The method of aspect 12, wherein the selectivity for production of C2+ is greater than 80%.

Aspect 14: The method of aspect 12, wherein the selectivity for production of C2+ is greater than 85%.

Aspect 15: The method of any one of aspects 12-14, wherein the selectivity for production of $CO_2$ is less than 10%.

Aspect 16: The method of any one of aspects 12-14, wherein the selectivity for production of $CO_2$ is less than 5%.

Aspect 17: The method of any one of aspects 9-11, wherein the method converts at least 55% of the CO in the syngas.

Aspect 18: A method of preparing the $CoMn_xSi_yO_z$ catalyst of any one of aspects 1-11 comprising the steps of: a) mixing a solution comprising an aqueous or polar solvent, silica, a cobalt salt, and a manganese salt with ammonium carbonate, thereby forming the $CoMn_xSi_yO_z$ catalyst.

Aspect 19: The method of aspect 18, further comprising drying the $CoMn_xSi_yO_z$ catalyst.

Aspect 20: The method of aspect 19, wherein the $CoMn_xSi_yO_z$ catalyst is not filtered or washed prior to the drying step.

Aspect 21: The method of aspect 18, further comprising filtering, washing, and drying the $CoMn_xSi_yO_z$ catalyst.

Aspect 22: The method of any one of aspects 19-21, further comprising calcining the dried $CoMn_xSi_yO_z$ catalyst at a temperature from about 200° C. to about 800° C.

Aspect 23: The method of any one of aspects 18-22, wherein the solution comprises an aqueous or polar solvent selected from the group consisting of water and glycol, or a combination thereof.

Aspect 24: The method of aspect 23, wherein solution comprises water and glycol, wherein the glycol is selected from the group consisting of ethylene glycol, propylene glycol, dipropylene glycol, tripropylene glycol, and butylene glycol, or a combination thereof.

Aspect 25: The method of any one of aspects 18-24, wherein the aqueous or polar solvent is water.

Aspect 26: The method of any one of aspects 18-25, wherein the temperature of the solution is from about 20° C. to about 40° C. during the mixing step.

Aspect 27: The method of any one of aspects 18-26, wherein the pH of the solution is from about 6.5 to about 8.5 during the mixing step.

Aspect 28: The method of any one of aspects 18-27, wherein solution comprises from about 0.1 mole % to about 2.0 mole % of the cobalt salt prior to the formation of the $CoMn_xSi_yO_z$ catalyst.

Aspect 29: The method of any one of aspects 18-28, wherein solution comprises from about 0.1 mole % to about 2.0 mole % of the manganese salt prior to the formation of the $CoMn_xSi_yO_z$ catalyst.

Aspect 30: The method of any one of aspects 18-29, wherein the cobalt salt is selected from the group consisting of cobalt (II) nitrate, cobalt (II) acetate cobalt tris(acetylacetonate), cobalt bis(acetylacetonate), cobalt (II) chloride, cobalt (II) bromide, cobalt (II) iodide, cobalt (II) sulfate, and cobalt (II) diacetate, or a combination thereof.

Aspect 31: The method of any one of aspects 18-30, wherein the manganese salt is selected from the group consisting of manganese (II) nitrate, manganese (II) acetate, manganese tris(acetylacetonate), manganese bis(acetylacetonate), manganese (II) chloride, manganese (II) bromide, manganese (II) iodide, and manganese (II) diacetate, or a combination thereof.

Aspect 32: The method of any one of aspects 18-31, further comprising mixing the $CoMn_xSi_yO_z$ catalyst with a support material.

Aspect 33: The method of any one of aspects 18-32, wherein the mixing step comprises adding ammonium carbonate to the solution to adjust the pH of the solution to from about 6.5 to about 8.5.

Aspect 34: A catalyst composition prepared by any of the methods of aspects 18-33.

EXAMPLES

The following examples are put forth so as to provide those of ordinary skill in the art with a complete disclosure and description of how the compositions, catalysts, and/or methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric.

1. Example 1 Preparation of CoMnSiO Using Ammonium Carbonate as Precipitating Agent 100 ml water was provided. 5.0 g of colloidal silica (40%) was added drop wise to the 100 ml if water. The colloidal silica was stirred in the water for 30 minutes at room temperature. 14.55 g of cobalt (II) nitrate and 12.55 g of manganese (II) nitrate were added to the water solution in solid form. The cobalt (II) nitrate and manganese (II) nitrate were dissolved in the water solution and stirred for 1 hour. A solution of 1 molar ammonium carbonate was added to the water solution in a drop wise manner until the solution had a pH of 7.2. This solution was aged for 3 hours at room temperature. The resulting catalyst was dried directly in an oven at 120° C. for 12 hours. The catalyst was neither filtered nor washed prior to drying. The dried catalyst was then calcined at 500° C. for 16 hours. Calcined catalyst was sprayed on an alumina support.

2. Example 2 Preparation of CoMnSiO Using Sodium Carbonate as Precipitating Agent (Comparative Sample)

100 ml water was provided. 2.0 g of fumed silica was added to the 100 ml if water. The fumed silica was stirred in the water for 1 hour at room temperature. This solution was then heated to 80° C. 14.55 g of cobalt (II) nitrate and 12.55 g of manganese (II) nitrate was added to the water solution being at 80° C. in solid form. The cobalt (II) nitrate and manganese (II) nitrate were dissolved in the water solution and stirred for 1 hour. A solution of 1 molar sodium carbonate was added to the water solution in a drop wise manner until the solution had a pH of 7.2. This solution was aged for 30 minutes at 80° C. The resulting catalyst was filtered and washed well with hot water. The washed catalyst was then dried in an oven at 120° C. for 12 hours. The dried catalyst was then calcined at 500° C. for 16 hours.

Calcined catalyst was sprayed on an alumina support.

3. Results

The crystallinity of the catalysts of Example 1 and 2 (comparative sample) were analyzed by x-ray powder diffraction (XRD) before sprayed on the alumina support. The crystallinity of size of the catalyst of Example 1 was determined to be 19.7 nm. The crystallinity of size of the catalyst of Example 2 (comparative sample) was determined to be 47.5 nm. Accordingly, the crystallinity size of the CoMnSiO catalyst produced with ammonium carbonate as the precipitating agent (Example 1) was about 28 nm smaller than the crystallinity size of the CoMnSiO catalyst produced with sodium carbonate as the precipitating agent (Example 2 comparative sample). A smaller crystallinity size of the catalyst can positively impact the performance of a catalyst. The XRD patterns for the catalyst of Examples 1 and 2 are shown in the FIGURE.

The BET surface area of the calcined (unsupported) catalyst of Example 1 was measured to be 83.1 $m^2/g$ using nitrogen adsorption isotherm in a Micromeritics Tristar II instrument. The BET surface area of the calcined (unsupported) catalyst of Example 1 was measured to be 45.6 $m^2/g$. Accordingly, the catalyst of the Example 1 has about 38 $m^2/g$ more BET surface area as compared to the catalyst of Example 2 (comparative sample). A higher BET surface area of the catalyst can positively impact the performance of a catalyst.

The performance of the catalysts of Example 1 and Example 2 (comparative sample) were tested as follows. The catalysts of Example 1 and Example 2 (comparative sample) were first activated with $H_2:N_2$ at 350° C. for 16 hours. The activated catalysts were then used to catalyze a reaction with $H_2$ and CO (syngas) at a feed ratio of 2. The reaction was done at 240° C. at 5 bar, at a space velocity of 1,875 WHSV ($ml \cdot g^{-1} \cdot h^{-1}$). The results of these reactions are shown in Table 1.

TABLE 1

|  | Example 1 | Example 2 - Comparative |
| --- | --- | --- |
| CO conversion | 63 | 48 |
| CO2 selectivity | 2.2 | 17.6 |
| Methane | 10.9 | 7.6 |
| Total C2+ hydrocarbon | 86.9 | 74.8 |

What is claimed is:

1. A composition comprising a catalyst having the formula $CoMn_xSi_yO_z$,
    wherein the molar ratio of x is from about 0.8 to about 1.2;
    wherein the molar ratio of y is from about 0.1 to about 1.0; and
    wherein the molar ratio of z is a number determined by the valence requirements of Co, Mn, and Si wherein the catalyst has a Scherrer crystallite size of less than about 40 nm,
    wherein the Si is silica.

2. The composition of claim 1, wherein the molar ratio of x is about 1.0.

3. The composition of claim 1, wherein the molar ratio of y is from about 0.3 to about 0.8.

4. The composition of claim 1, wherein the catalyst has a BET surface area from about 60 $m^2/g$ to about 110 $m^2/g$.

5. The composition of claim 1, wherein the catalyst has a perovskite structure.

6. The composition of claim 1, wherein the catalyst has a Scherrer crystallite size from about 10 nm to about 25 nm.

7. The composition of claim 1, further comprising a support material.

8. The composition of claim 7, wherein the support material comprises $Al_2O_3$, $SiO_2$, $TiO_2$, $CeO_2$, $AlPO_4$, $ZrO_2$, MgO, $ThO_2$, boehmite, silicon-carbide, Molybdenum-carbide, an alumino-silicate, kaolin, a zeolite, a molecular sieve, or a mixture thereof.

9. A method of producing C2+ hydrocarbons comprising contacting syngas with the composition of claim 1, thereby producing C2+ hydrocarbons.

10. The method of claim 9, wherein the selectivity for production of C2+ is greater than 85%.

11. The method of claim 9, wherein the selectivity for production of $CO_2$ is less than 5%.

12. The method of claim 9, wherein the method converts at least 55% of the CO in the syngas.

13. A method of preparing the $CoMn_xSi_yO_z$ catalyst of claim 1 comprising the steps of:
    a) mixing a solution comprising an aqueous or polar solvent, silica, a cobalt salt, and a manganese salt with ammonium carbonate, thereby forming the $CoMn_xSi_yO_z$ catalyst.

14. The method of claim 13, further comprising drying the $CoMn_xSi_yO_z$ catalyst.

15. The method of claim 13, further comprising calcining the dried $CoMn_xSi_yO_z$ catalyst at a temperature from about 200° C. to about 800° C.

16. The method of claim 13, wherein the solution comprises an aqueous or polar solvent selected from the group consisting of water and glycol, or a combination thereof.

17. The method of claim 13, wherein the aqueous or polar solvent is water.

18. The method of claim 13, further comprising mixing the $CoMn_xSi_yO_z$ catalyst with a support material.

19. The method of claim 13, wherein the mixing step comprises adding ammonium carbonate to the solution to adjust the pH of the solution to from about 6.5 to about 8.5.

20. A catalyst composition prepared by the methods of claim 13.

* * * * *